(12) United States Patent
Bialek et al.

(10) Patent No.: US 8,574,654 B2
(45) Date of Patent: Nov. 5, 2013

(54) FROZEN AERATED CONFECTION AND ITS MANUFACTURING PROCESS

(75) Inventors: Jadwiga Malgorzata Bialek, Vlaardingen (NL); David John Judge, Sharnbrook (GB); Jeffrey Underdown, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 800 days.

(21) Appl. No.: 12/151,672

(22) Filed: May 8, 2008

(65) Prior Publication Data

US 2008/0286432 A1    Nov. 20, 2008

(30) Foreign Application Priority Data

May 9, 2007 (EP) .................................. 07107851

(51) Int. Cl.
*A23G 9/04* (2006.01)

(52) U.S. Cl.
USPC ......................................... 426/567; 426/568

(58) Field of Classification Search
USPC .................................. 426/567, 568
See application file for complete search history.

(56) References Cited

U.S. PATENT DOCUMENTS

| 5,063,077 A | 11/1991 | Vollbrecht et al. | |
| 6,497,913 B1 * | 12/2002 | Gray et al. | 426/565 |
| 6,770,317 B2 * | 8/2004 | Takahashi et al. | 426/586 |
| 2003/0113436 A1 | 6/2003 | Fukinbara et al. | |

FOREIGN PATENT DOCUMENTS

| EP | 0574907 | 12/1993 |
| EP | 1223177 | 7/2002 |
| EP | 1223177 A1 | 7/2002 |
| JP | 10201426 | 8/1998 |
| WO | WO 00/01246 | 1/2000 |

OTHER PUBLICATIONS

Belitz, H.D. et al. Food Chemistry, 1999. Second Edition. Published by Springer-Verlag Berlin, Heidelberg. p. 519.*
Mine Yoshinori. "Emulsifying characterization of hens egg yolk proteins in oil-in-water emulsions". Food Hydrocolloids 12 (1998) (no month), pp. 409-415.*
International Search Report International Application No. PCT/EP2008/055402 dated Jul. 7, 2008.
Pelan et al., "The Stability of Aerated Milk Protein Emulsions in the Presence of Small Molecule Surfactants", J. Dairy Sci., 1997, 80: 2631-2638.
Arbuckle, Ice Cream, $2^{nd}$ Edition, AVI Publishing, 1972, p. 194.
Arbuckle, Ice Cream, $4^{th}$ Edition, AVI Publishing, 1986, Chapter 1, pp. 1-3.
Arbuckle, Ice Cream, $4^{th}$ Edition, AVI Publishing, 1986, Chapter 6, pp. 84-92.
Arbuckle, Ice Cream, $4^{th}$ Edition, AVI Publishing, 1986, Chapter 6, pp. 92-94.
Dyer-Hurdon et al, Cholesterol Content and Functionality of Plasma and Granules Fractionated from Egg Yolk, Journal of Food Science, 1993, 1277-1281, vol. 58-No. 6.
Le Denmat et al., Protein Denaturation and Emulsifying Properties of Plasma and Granules of Egg Yolk as Related to Heat Treatment, Journal of Food Science, 1999, 194-197, 64 (2).

* cited by examiner

*Primary Examiner* — D Lawrence Tarazano
*Assistant Examiner* — Jenna A Watts
(74) *Attorney, Agent, or Firm* — Gerard J. McGowan, Jr.

(57) ABSTRACT

Process for manufacturing a frozen aerated confection and comprising the steps 5 of
  producing a premix comprising
    milk/dairy or vegetable fat 1 to 15% (w/w), preferably 3 to 12%
    milk solids non fat 0 to 20% (w/w), preferably 3 to 12%
    sugar and other sweeteners 0.01 to 35% (w/w)
    vegetable proteins 0 to 5% (w/w)
    flavors 0 to 5% (w/w)
    water 30 to 85% (w/w)
    0.25 to 15% by weight (expressed as dry plasma over the wet premix) of an enriched plasma fraction is added to the premix
  freezing and aerating the premix to an overrun of 20 to 150%.

13 Claims, 4 Drawing Sheets

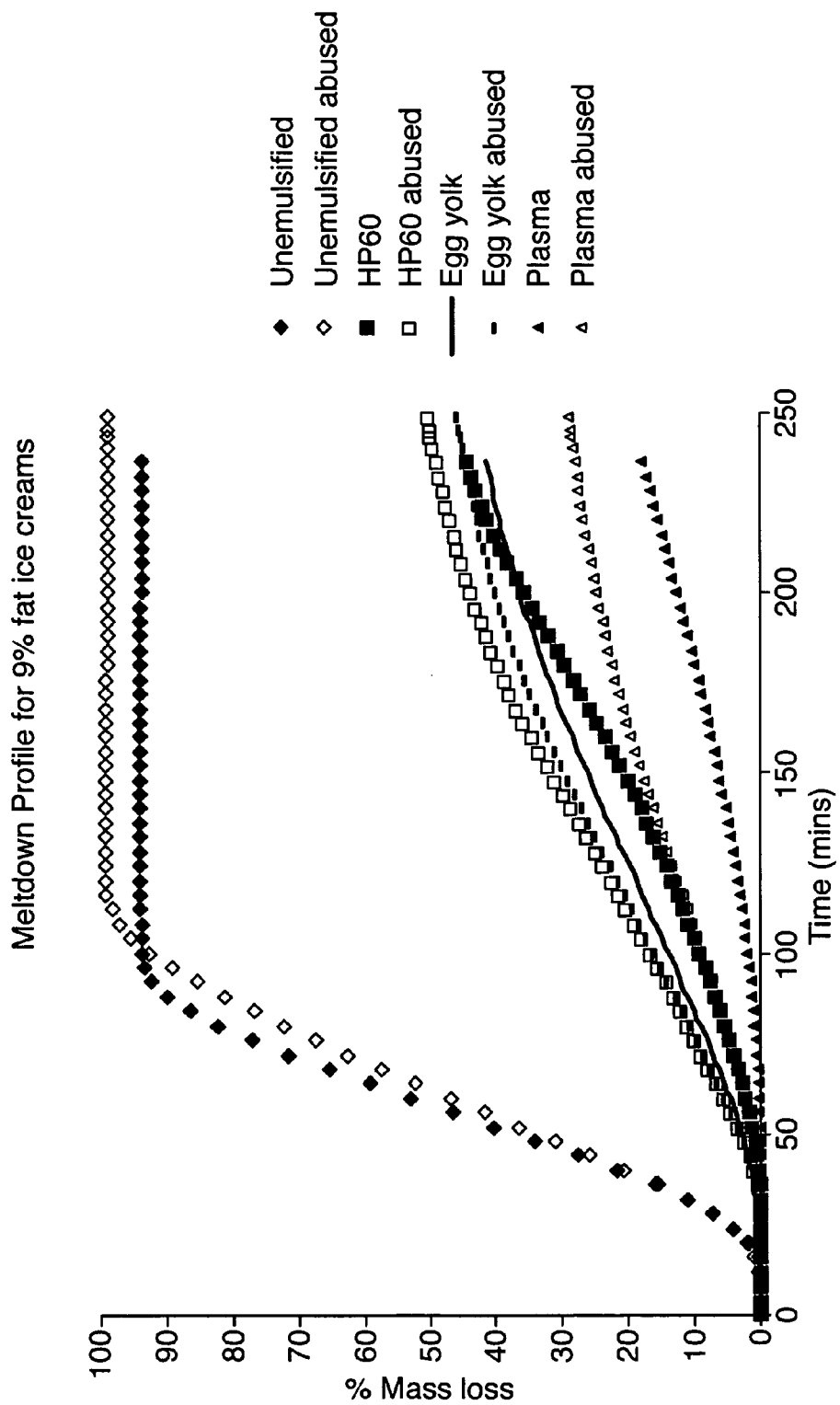

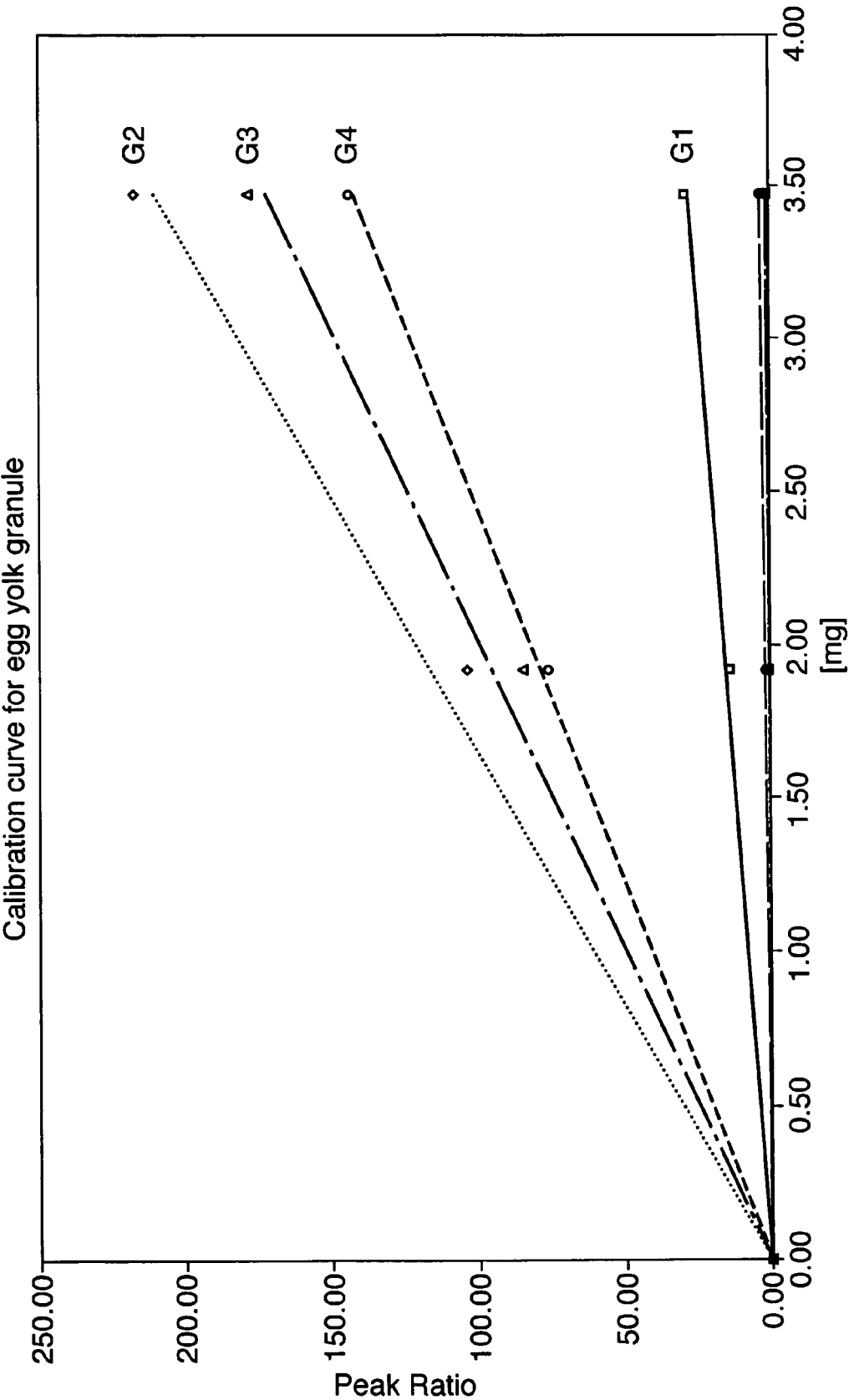

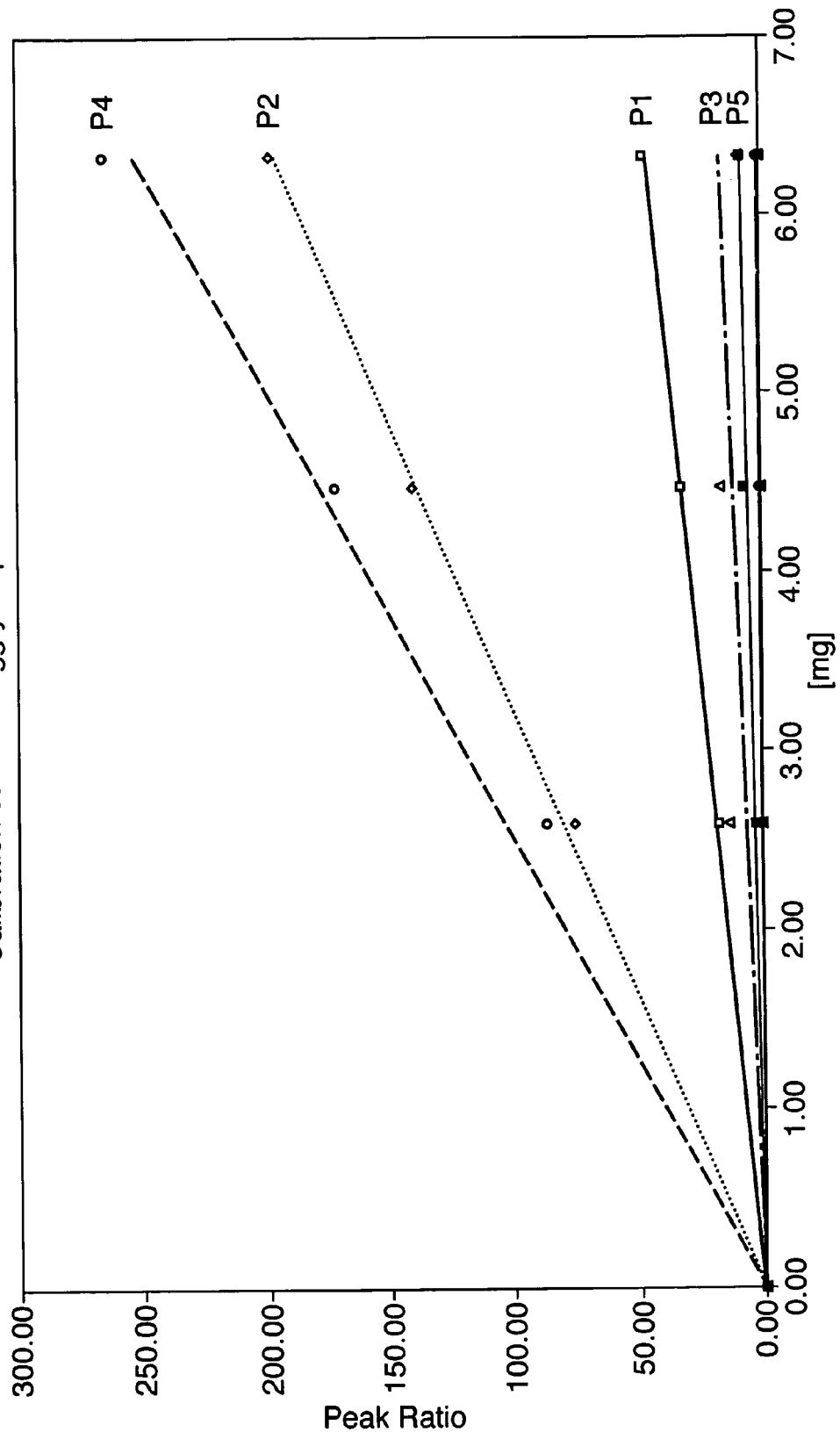
Fig. 4. Calibration curve for egg yolk plasma

FROZEN AERATED CONFECTION AND ITS MANUFACTURING PROCESS

TECHNICAL FIELD OF THE INVENTION

The present invention relates to a frozen aerated confection and to its manufacturing process. The present invention more particularly relates to an ice cream comprising an egg yolk fraction as destabilising emulsifier.

BACKGROUND

It is known that the presence of a fine microstructure is critical to produce an ice cream that has a creamy texture and has good meltdown properties.

However the microstructure produced in a conventional ice cream freezer (e.g. a scraped surface heat exchanger) has been found to be unstable and both ice crystals and gas bubbles coarsen significantly in the time taken to harden the product to typical storage temperatures of −25 C. An important step to maintain the desired microstructure is to stabilise the gas bubbles during hardening. This is achieved by generating a partial network of fat aggregates adsorbed onto the air interface to provide a steric barrier to gas cell coalescence. To generate this fat network, a proportion of the oil droplets need to partially coalesce as a consequence of the shear regime encountered within the ice cream freezer. In order to control this process of fat destabilisation, so called destabilising emulsifiers are often used to displace milk protein at the oil:water interface and generate higher levels of fat destabilisation. Thus, the presence of a destabilised fat network prevents excessive gas bubble coarsening and helps maintain the desired fine microstructure.

Up to now, this has been achieved by using chemical products which are more and more perceived by consumers as being negative and/or detrimental to the environment or to human health. There is therefore a need for finding and using destabilising emulsifiers which could be used with an "all natural" composition.

It has now been found that such destabilising emulsifiers exist in eggs and can be extracted by centrifugation.

DEFINITIONS

Emulsifiers
Emulsifiers are defined as in Arbuckle, W. S., Ice Cream, 4th Edition, AVI publishing, 1986, ch 6 p 92-94.
Stabilizers
Stabilizers are defined as in Arbuckle, W. S., Ice Cream, 4th Edition, AVI Publishing, 1986, ch 6, p 84-92. They can for example be locust bean gum, carrageenan, guar gum, gelatin, carboxy methyl cellulose gum, pectin, algin products and mixtures thereof.
Frozen Aerated Confection
A definition of a frozen aerated confection can be found it Arbuckle, W. S., Ice Cream, 4th Edition, AVI Publishing, 1986, ch 1, p 1-3. Preferably, a frozen aerated confection according to the invention is a milk or fruit based frozen aerated confection such as ice cream. An ice cream is a frozen food made by freezing a pasteurized mix with agitation to incorporate air. It typically contains ice, air, fat and a matrix phase and preferably;
   milk/dairy or vegetable fat 1 to 20% (w/w), preferably 3 to 12%
   milk solids non fat 0 to 20% (w/w), preferably 3 to 12%
   sugar and other sweeteners 0.01 to 35% (w/w)
   vegetable proteins 0 to 5% (w/w)
   flavours 0 to 5% (w/w)
   water 30 to 85% (w/w)

Overrun:
Overrun is defined as in Ice Cream—W. S. Arbuckle—Avi Publishing—1972—page 194.
Destabilising Emulsifier
Destabilising emulsifier means any emulsifier which gives, at a level of 0.3%, a level of extracted fat of at least 15% in an ice cream premix containing 12% butter oil, 13% skim milk powder and 15% sucrose as described in FIG. 4 in 'The stability of aerated milk protein emulsions in the presence of small molecule surfactants' 1997—Journal of Dairy science 80:2631:2638.

Examples of such destabilising emulsifiers are saturated and unsaturated monoglyceride, polyglycerol esters, sorbitan esters, stearoyl lactylate, lactic acid esters, citric acid esters, acetyllated monoglyceride, diacetyl tartaric acid esters, and polyoxyethylene sorbitan esters.
Tests
Egg Yolk and Egg Yolk Fractionation Used in the Examples.
Egg yolk is composed of a granule fraction and a relatively water soluble fraction called plasma. Typically, an egg contains 80% w/w plasma and 20% w/w granule. Using centrifugation, egg yolk can be fractionated into a plasma fraction and a granule fraction. Each fraction contains lipoprotein as its main constituent. The plasma fraction contains low density lipoprotein and a water soluble protein fraction (livetin) whereas the granule fraction mainly consists of high density lipoprotein (lipovitellin), a phosphoprotein (phosvitin) and low density lipoprotein.

Fractionating by centrifugation is a mild process in a low-molarity salt solution.

In the experiments described hereunder, fractionation was operated as follows.

Fresh egg yolk at +5° C. is diluted with a 0.17M Sodium Chloride solution in a 1:1 ratio and dispersed under gentle shear for 1 hour using an over head stirrer. The diluted egg yolk is then spun in the centrifuge operating at 8000 g for 40 minutes at 5° C. The supernatant (plasma rich) is then carefully decanted from the sedimented fraction (granule rich). This process of centrifugation followed by separation of the supernatant can be repeated until no visible sediment can be observed. At this point it is assumed that a "pure" plasma fraction has been produced. The plasma fraction is then stored at +5° C. before use.

An enriched plasma fraction is defined as an egg yolk fraction wherein the plasma/granule weight ratio has increased whereas a depleted plasma fraction is as an egg yolk fraction wherein the plasma/granule weight ratio has decreased.
Alternative Egg Yolk Separation
An alternative method using industrial equipments was tested leading to proper separation in one single step.

Pasteurised liquid egg yolk is placed in a 120 liter Winkworth jacketed vessel, which is kept at a temperature of 5° C. The same weight of a 0.17M salt solution is added and the mix is gently stirred for approximately 1 hour.

The mix is transferred to the feed vessel of an Alfa Laval separator (model BTPX 205SGD-34CDP). It is passed through the machine at approximately 100 l/hr. at a rotation speed of 8000 r.p.m. The back pressure on the supernatant (plasma phase) exit flow is set to 14-21 lb/in$^2$ (1-1.5 bar) and the precipitate is discharged every 8-10 minutes.

The precipitate (granule phase) is generally discarded. At the completion of the batch, the plasma phase is returned to the feed vessel and passed through the separator a second time, employing the same conditions as the first pass. Again, the granule phase is discarded.

The plasma phase is then used in its liquid form, or can be freeze dried.

Premix Fat Droplet Sizing

Particle sizes in the premix emulsion were measured using a Malvern Mastersizer 2000 (Malvern Instruments, UK) with water as the continuous phase using the 45 mm lens and the presentation code 2 NAD. Two ml of premix is dispersed in twenty ml of Sodium Dodecyl Sulphate (SDS) and Urea solution (comprising 0.1% w/w SDS and 39.9% Urea and the balance deionised water) and allowed to stand at ambient temperature for fifteen minutes prior to measurement Ultrasound was applied to the Mastersizer tank for one minute before measurement. The diameter by which 90% by volume of the distribution was smaller, d[0.9] was taken as the limit of individual fat droplets.

Preparation of Frozen Aerated Confections 150 ml of mix was aerated and frozen simultaneously in a stirred pot apparatus which consists of a cylindrical, vertically mounted, jacketed stainless steel vessel with internal dimensions of height 105 mm and diameter 72 mm. The rotor used to shear the sample consisted of a rectangular impeller of the correct dimensions to scrape the surface edge of the container as it rotates (72 mm×41.5 mm). Also attached to the rotor are two semi-circular (60 mm diameter) high-shear blades positioned at a 45° angle to the rectangular impeller. The apparatus is surrounded by a metal jacket connected to a circulating cooling bath (Lauda Kryomat RVK50). This allows control of the wall temperature.

The freezing and aeration was conducted as follows. The stirred pot vessel was chilled to 5° C. and the mix was poured into it. The coolant temperature was set to −25° C. but the circulation was turned off so that there was no significant flow of cooling liquid through jacket. The mix was sheared at 100 rpm; after 15 seconds the circulation was switched on so that the coolant flowed through the jacket, cooling the equipment and mix. After a further 45 seconds the rotor speed was increased to 1000 rpm for 2 minutes, and then reduced to 300 rpm until the aerated mix reached −5° C., at which point the rotor was stopped and the frozen aerated confection was removed from the vessel.

Emulsion Stability Characterisation

Two reference formulations were used, one with a standard emulsifier (HP60-obtainable from Danisco) and one without any added emulsifier.

With emulsifier (in parts by weight)

| | |
|---|---|
| Coconut oil | 9.0 |
| Skim Milk Powder | 7.4 |
| HP60 emulsifier | 0.285 |
| Guar Gum | 0.0625 |
| Carrageenan | 0.0175 |
| Locust Bean Gum | 0.1450 |
| Sucrose | 20.0 |
| Water | 63.09 |

The unemulsified reference formulation is the same as the above, but with the HP60 ingredient removed and the water content increased by 0.285 pbw to 63.375 pbw).

10 liters of coarse emulsion is made up by adding the ingredients to water at 20° C. and stirring with an overhead stirrer. This is heated on a steam kettle to 80° C. to pasteurise the mix. It is then mixed further using a Silverson mixer for 10 minutes.

The emulsion is then homogenised at 300 bar using an APV homogeniser fitted with a Pandolfe valve. After homogenisation the emulsion is passed through a plate heat exchanger to cool the mix to 5° C.

The oil droplet size distribution is measured on a Malvern Mastersizer 2000 according to the method described above under "Premix Fat Droplet Sizing".

The emulsion is frozen and aerated in a jacketed vessel according to the protocol in the attachment (stirred pot description.doc)

The oil droplet size distribution in the melted ice cream is also measured in the Malvern Mastersizer.

The amount of destabilised fat is calculated as the total volume percentage of oil droplets within the melted ice cream that have diameters greater than the D(0.9) of the original homogenised mix before it is frozen and aerated.

Detection of Egg Yolk Fractions in Ice Cream

1 Method 1.1 Chemicals

Angiotensin II human (Sigma A9525)

Ammonium bicarbonate solution: 100 mM Ammonium bicarbonate in water; pH 8.0

Potassium oxalate solution: 10% Potassium oxalate in water n-hexane

RapiGest: 20 g/l RapiGest™ SF (Waters 186002122) in water (RapiGest™ SF is a reagent used to enhance enzymatic digestion of proteins. RapiGest SF helps solubilize proteins, making them more susceptible to enzymatic cleavage without inhibiting enzyme activity. Unlike other commonly used denaturants, such as SDS or urea, RapiGest SF does not modify peptides or suppress protease activity. It is compatible with enzymes such as Trypsin, Lys-C, Asp-N and Glu-C and other enzymes)

DTT: 1 M Dithiothreitol in Ammonium bicarbonate solution

Iodoacetamide solution: 500 mM Iodoacetamide in Ammonium bicarbonate solution

Trypsin Agarose Immobilized Trypsin, TPCK treated (Pierce 20230)

TFA: 10% Trifluoroacetic acid in water 1.2 Preparation 1 g sample is spiked with 50 μg Angiotensin II (internal standard). 1 ml ammonium bicarbonate solution, 100 μl potassium oxalate solution and 5 ml n-hexane is added to each sample, vortexed thoroughly and centrifuged for 10 min at 6000 g. the organic layer is discarded, the aqueous phase is extracted a second time with 5 ml n-hexane and centrifuged for 10 min at 6000 g. The aqueous extract is used for digestion.

1.3 Digest

90 μl aqueous extract, 10 μl RapiGest and 2.5 μl DTT are incubated for 30 min at 60° C. 15 μl Iodoacetamide solution is added and the samples are incubated for 30 min at Room Temperature in the dark [1]. 100 μl of immobilised Trypsin (washed 3× with ammonium bicarbonate solution) is added and the samples incubated over night at 37° C. at 750 rpm [1].

The samples are acidified to pH 2 by adding 15 μl TFA solution, incubated for 30 min at 37° C. and centrifuged for 10 min at 12000 g.

The supernatant is filtered and used for HPLC.

1.4 Liquid Chromatography/Mass Spectrometry

| | |
|---|---|
| Liquid chromatograph: | Waters Acquity UPLC System |
| Mass Spectrometer: | Waters Micromass Q-Tof Premier ESP+, V-Mode, 200-2000 Da |
| Column: | Waters Acquity Beh130 C18 |

-continued

| Mobile Phase A: | 0.1% Formic acid in Water | | | |
|---|---|---|---|---|
| Mobile Phase B: | 0.1% Formic acid in Acetonitrile | | | |
| Programme: | 0 min | 0.2 ml/min | 95% A | 5% B |
| | 2 min | 0.2 ml/min | 95% A | 5% B |
| | 60 min | 0.2 ml/min | 60% A | 40% B (linear) |
| | 61 min | 0.2 ml/min | 0% A | 100% B |
| | 64 min | 0.2 ml/min | 0% A | 100% B |
| | 65 min | 0.2 ml/min | 95% A | 5% B |

1.5 Specific Markers

TABLE 1

Specific markers for egg yolk fractions

| Marker Peak | Specific for | m/z | Retention Time |
|---|---|---|---|
| S1 | Internal Standard (Angiotensin II) | 676.34 ± 0.05 | 26.7 |
| G1 | Egg Yolk Granule | 689.32 ± 0.05 | 8.0 |
| G2 | Egg Yolk Granule | 538.29 ± 0.05 | 9.7 |
| G3 | Egg Yolk Granule | 481.26 ± 0.05 | 15.7 |
| G4 | Egg Yolk Granule | 575.33 ± 0.05 | 17.2 |
| P1 | Egg Yolk Plasma | 732.39 ± 0.05 | 6.2 |
| P2 | Egg Yolk Plasma | 548.31 ± 0.05 | 15.6 |
| P3 | Egg Yolk Plasma | 509.27 ± 0.05 | 31.8 |
| P4 | Egg Yolk Plasma | 884.55 ± 0.05 | 37.8 |
| P5 | Egg Yolk Plasma | 791.73 ± 0.05 | 51.4 |

1.6 Qualitative Evaluation

Presence of marker peaks G1-G4 indicates the presence of egg yolk granule in the sample whereas marker peaks P1-P5 indicate the presence of egg yolk plasma. In whole egg yolk both marker peak types are present.

1.7 Quantitative Evaluation

The Angiotensin signal S1 is used for internal calibration. Peak areas for G1-G4 and P1-P5 are divided by peak area S1. For quantitative evaluation standards of pure egg yolk, egg yolk granule and egg yolk plasma are processed and used for calibration resulting in calibration curves for each marker (G1/S1, P1/S1, etc; cf. Figures).

For each sample the egg yolk fraction content is determined from each calibration curve separately resulting in 4 values for granule and 5 values for plasma. The average of the 4 granule values and the average of the 5 plasma values is calculated to determine the granule respectively plasma content in the sample. The ratio dry granule/dry plasma in egg yolk determined by this method is approx. 0.16. Deviations from this value indicate either the addition of egg yolk plasma and egg yolk granule to the product or the addition of whole egg yolk and extra egg yolk plasma or egg yolk granule.

2 Results 2.1 Limit of Detection (LOD)

The following table shows the limit of detection for whole egg yolk and egg yolk fractions.

| | Amount |
|---|---|
| LOD Dry Yolk | 1.2 mg |
| LOD Dry Plasma | 1.5 mg |
| LOD Dry Granule | 1.5 mg |

3 Figures

FIGS. 3 and 4 show Calibration curve for egg yolk granule and plasma.

Using calibration curves, it is therefore possible to obtain the granule and the plasma contents of a given ice cream and the plasma/granule ratio.

BRIEF DESCRIPTION OF THE INVENTION

It is a first object of the present invention to provide a frozen aerated confection comprising 0.15 to 15% by weight (based on dry plasma over the total frozen aerated confection) of an enriched plasma fraction. Preferably, the frozen aerated confection contains less than 10% of an enriched plasma fraction.

Preferably, the frozen aerated confection contains over 0.5%, more preferably over 0.75% most preferably over 1% by weight (based on dry plasma over the total frozen aerated confection) of an enriched plasma fraction.

Preferably also, the frozen aerated confection contains less that 5%, more preferably less that 3% by weight (based on dry plasma over the total frozen aerated confection) of an enriched plasma fraction Preferably, the enriched plasma fraction contains less than 10%, more preferably less than 5%, even more preferably less than 1% (based on dry granule) of granule fraction.

More preferably, the frozen aerated confection contains:

milk/dairy or vegetable fat 1 to 20% (w/w), preferably 3 to 12% milk solids non fat 0 to 20% (w/w), preferably 3 to 12% sugar and other sweeteners 0.01 to 35% (w/w)

vegetable proteins 0 to 5% (w/w)

flavours 0 to 5% (w/w)

water 30 to 85% (w/w)

It is another object of the invention to provide a frozen aerated confection comprising 0.15 to 5% by weight of plasma (based on dry plasma over the total frozen aerated confection) and having a plasma/granule weight ratio of at least 10.

More preferably, the frozen aerated confection comprises less than 3% by weight of plasma (based on dry plasma over the total frozen aerated confection).

More preferably, the frozen aerated confection comprises over 0.5%, more preferably over 0.75% most preferably over 1% by weight of plasma (based on dry plasma over the total frozen aerated confection).

More preferably also, the plasma/granule weight ratio is above 20, preferably above 100.

More preferably also, the frozen aerated confection contains:

milk/dairy or vegetable fat 1 to 20% (w/w), preferably 3 to 12% milk solids non fat 0 to 20% (w/w), preferably 3 to 12% sugar and other sweeteners 0.01 to 35% (w/w)

vegetable proteins 0 to 5% (w/w)

flavours 0 to 5% (w/w)

water 30 to 85% (w/w)

It is yet another object of the invention to provide a process for manufacturing a frozen aerated confection and comprising the steps of producing a premix comprising
- milk/dairy or vegetable fat 1 to 20% (w/w), preferably 3 to 12%
- milk solids non fat 0 to 20% (w/w), preferably 3 to 12%
- sugar and other sweeteners 0.01 to 35% (w/w)
- vegetable proteins 0 to 5% (w/w)
- flavours 0 to 5% (w/w)
- water 30 to 85% (w/w)

freezing and aerating the premix to an overrun of 20 to 150% characterised in that 0.25 to 15% by weight (expressed as dry plasma over the wet premix) of an enriched plasma fraction is added to the premix.

Preferably, over 0.5%, more preferably over 0.75% most preferably over 1% by weight (based on dry plasma over the wet premix) of an enriched plasma fraction is added to the premix Preferably also less that 10%, more preferably less than 5%, even more preferably less that 3% by weight (based on dry plasma over the wet premix) of an enriched plasma fraction is added to the premix.

Preferably also, 0.15 to 5% by weight of plasma (based on dry plasma over the total frozen aerated confection) is added to the premix. More preferably, less than 3% by weight of plasma is added to the premix. More preferably, over 0.5%, even more preferably over 0.75% most preferably over 1% by weight of plasma is added to the premix.

Preferably the enriched plasma fraction contains less than 10%, more preferably less than 5%, even more preferably less than 1% (based on dry granule) of granule fraction.

It is yet another object of the invention to provide a process for manufacturing a frozen aerated confection and comprising the steps of
producing a premix comprising
- milk/dairy or vegetable fat 1 to 20% (w/w), preferably 3 to 12%
- milk solids non fat 0 to 20% (w/w), preferably 3 to 12%
- sugar and other sweeteners 0.01 to 35% (w/w)
- vegetable proteins 0 to 5% (w/w)
- flavours 0 to 5% (w/w)
- water 30 to 85% (w/w)

freezing and aerating the premix to an overrun of 20 to 150% characterised in that 0.25 to 15% by weight (expressed as dry plasma over the wet premix) of plasma is added to the premix.

Preferably also, 0.15 to 5% by weight of plasma ((based on dry plasma over the wet premix) is added to the premix. More preferably, less than 3% by weight of plasma is added to the premix. More preferably, over 0.5%, even more preferably over 0.75% most preferably over 1% by weight of plasma is added to the premix.

DETAILED DESCRIPTION OF THE INVENTION

The present invention will be further described in the following examples and with reference to FIGS. 1 to 4.

FIG. 2 represents the meltdown profile of 9% fat ice creams.

FIGS. 3 and 4 represent calibration curves for granule and plasma respectively.

Figure 1:
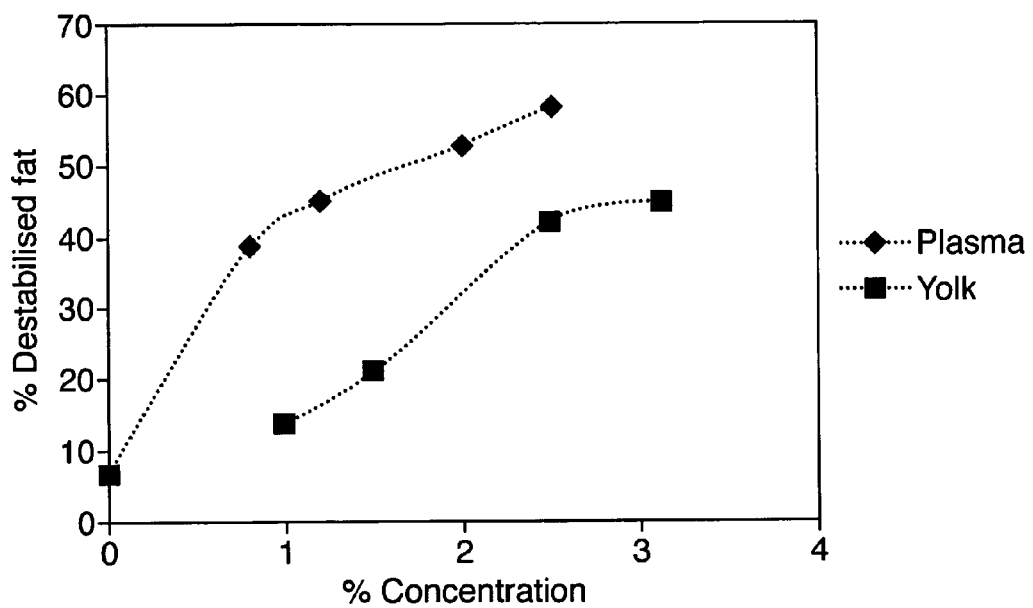
FIG. 1 represents the percentage of destabilised fat as a function of the egg yolk and plasma concentration (based on dry matter of plasma and egg yolk against the whole composition).

To study the emulsion stability, a series of emulsions was produced on top of the control emulsions already described under "Tests and definitions—Emulsion stability characterisation".

The various emulsions produced are summarised in the following Table 1 and the resulting data for a range of egg yolk solids and plasma solids are given in FIG. 1. This shows that the destabilising power of egg yolk plasma is very surprisingly far greater than that of egg yolk

TABLE 1

|  | Control | Emulsified Control | 2% Egg Yolk | 2% Plasma |
| --- | --- | --- | --- | --- |
| CNO | 9 | 9 | 9 | 9 |
| Sucrose | 20 | 20 | 20 | 20 |
| SMP | 7.4 | 7.4 | 7.4 | 7.4 |
| HP60 |  | 0.285 |  |  |
| LBG | 0.145 | 0.145 | 0.145 | 0.145 |
| Guar | 0.0625 | 0.0625 | 0.0625 | 0.0625 |
| Carrageenan L100 | 0.0175 | 0.0175 | 0.0175 | 0.0175 |
| Egg Yolk |  |  | 2 |  |
| Egg Yolk Plasma* |  |  |  | 10.7 |
| Vanilla | 0.16 | 0.16 | 0.16 | 0.16 |
| Vanillin | 0.012 | 0.012 | 0.012 | 0.012 |
| Water | 63.20 | 62.92 | 61.20 | 52.50 |

*Plasma is added at 10.7% of a fractionated solution of egg yolk. This results in 2% dry weight of plasma.

Having established that egg yolk plasma is a much better destabilising emulsifier than what could have been anticipated, its influence on meltdown properties was studied. To that end, a series of ice creams were produced, all aerated to an overrun of 100%.

The results are summarised in FIG. 2 which clearly shows that the meltdown performance of a mono/diglyceride containing ice cream can be matched by an plasma containing ice cream. In other respect, informal blind tasting of these samples resulted in a definite preference for the plasma containing samples with regard to texture and flavour.

In other respect, it was tested whether freeze dried fractions could be used. To that end egg yolk fraction was poured into stainless steel trays to a depth of 1-2 cm and frozen at −40° C. for 6 hours. It was freeze dried in a Severn Science LS40 5-shelf freeze dryer with shelf temperature 20° C., condenser temperature −55° C. and chamber/condenser pressure of 0.01 mbar. Dryness was tested by isolation of the drying chamber and witnessing a negligeable pressure rise (less than 0.001 mbar in 3 minutes) within the drying chamber—suggesting that water vapour was no longer being driven from the sample. Drying time was approximately 72 hours for 10 kg of wet egg yolk fraction. The resulting fractions were used and results similar to those obtained with non freeze dried plasma were obtained.

The invention claimed is:

1. A frozen aerated confection, which is an ice cream, comprising 0.15 to 15% by weight (based on weight of dry plasma to total weight of frozen aerated confection) of an enriched plasma fraction as a destabilizing emulsifier, said enriched plasma fraction defined as an egg yolk fraction wherein the plasma/granule weight ratio has been increased, wherein the enriched plasma fraction contains less than 10 wt % (based on dry matter) of granule fraction.

2. The frozen aerated confection according to claim 1 wherein the enriched plasma fraction contains less than 5% (based on dry matter) of the granule fraction.

3. The frozen aerated confection according to claim 1, containing:
  milk/dairy or vegetable fat 1 to 20% (w/w),
  milk solids non fat 0 to 20% (w/w),
  sugar and other sweeteners 0.01 to 35 (w/w)
  vegetable proteins 0 to 5% (w/w)
  flavours 0 to 5% (w/w)
  water 30 to 85% (w/w).

4. The frozen aerated confection according to claim 1 comprising from over 0.75% by weight to less than 5% by weight of enriched plasma fraction and having a plasma/granule ratio of at least 10.

5. A Process for manufacturing a frozen aerated confection and comprising the steps of producing a premix comprising
  milk/dairy or vegetable fat 1 to 20% (w/w),
  milk solids non fat 0 to 20% (w/w),
  sugar and other sweeteners 0.01 to 35% (w/w)
  vegetable proteins 0 to 5% (w/w)
  flavours 0 to 5% (w/w)
  water 30 to 85% (w/w)
freezing and aerating the premix to an overrun of 20 to 150% wherein 0.25 to 15% by weight (expressed as weight of dry plasma relative to total weight of premix) of an enriched plasma fraction as destabilizing emulsifier, said enriched plasma fraction defined as an egg yolk fraction wherein the plasma/granule weight ratio has been increased, is added to the premix and wherein the enriched plasma fraction contains less than 10 wt % based on dry matter of granule fraction.

6. The process according to claim 5 wherein the enriched plasma fraction contains less than 5%, (based on dry matter) of granule fraction.

7. The frozen aerated confection according to claim 1 wherein the enriched plasma fraction contains less than 1% (based on dry matter) of the granule fraction.

8. The process according to claim 5 wherein the enriched plasma fraction contains less than 1%, (based on dry matter) of the granule fraction.

9. The frozen aerated confection according to claim 1 wherein the ice cream has an amount of destabilised fat of 40% or higher and the frozen aerated confection containing over 1% by weight to 15% by weight of the enriched plasma fraction, wherein the amount of destabilized fat is calculated as total volume percentage of oil droplets within a melted sample of ice cream that have diameters greater than D(0.9) of an original homogenised mix of the ice cream before it is frozen and aerated.

10. The frozen aerated confection according to claim 3 comprising 3 to 12% w/w of milk/dairy or vegetable fat.

11. The frozen aerated confection according to claim 3 comprising 3 to 12% w/w milk solids non fat.

12. The process according to claim 6 comprising 3 to 12% w/w milk/dairy or vegetable fat.

13. The process according to claim 6 comprising 3 to 12% (w/w) milk solids non fat.

* * * * *